United States Patent [19]

Roeder

[11] 4,003,556

[45] Jan. 18, 1977

[54] FLAME-CUTTING MACHINE

[75] Inventor: Georg Roeder, Frankfurt am Main, Germany

[73] Assignee: Messer Griesheim GmbH, Frankfurt am Main, Germany

[22] Filed: Sept. 9, 1975

[21] Appl. No.: 611,636

[30] Foreign Application Priority Data

Oct. 2, 1974 Germany ............................ 2447035

[52] U.S. Cl. .................................. 266/48; 148/9 R; 266/58; 266/69
[51] Int. Cl.² ....................... B23K 7/02; B23K 7/10
[58] Field of Search ............... 148/9 R; 266/48, 49, 266/58–60, 62, 63, 65, 69

[56] References Cited

UNITED STATES PATENTS

| | | | |
|---|---|---|---|
| 3,743,260 | 7/1973 | Alleman et al. | 266/65 X |
| 3,770,110 | 11/1973 | Boskovitch | 266/65 X |

Primary Examiner—Roy Lake
Assistant Examiner—Paul A. Bell
Attorney, Agent, or Firm—Connolly and Hutz

[57] ABSTRACT

A flame-cutting machine having a moving torch carriage includes a scrap-cutting arrangement which is mounted directly on the torch unit and is activated in accordance with the movement of the flame-cutting machine.

15 Claims, 5 Drawing Figures

FLAME-CUTTING MACHINE

BACKGROUND OF THE INVENTION

The invention relates to a flame-cutting machine, consisting of a traveling carriage provided with a transverse track and of at least one torch carriage arranged movably on the transverse track with at least one cutting torch as well as with a scrap-cutting arrangement.

Flame-cutting machines of the above-mentioned class are known in the general prior art and, among other things, may be employed, for example, for trimming the edges of metal sheets. For edge trimming, torch units are often required with two or three simultaneously operating cutting torches. the process (chamferred) edges in later processing serve as welding edges. Edges, respectively fitted to each other, of two sheets to be welded together then form a V, X or Y seam, depending on the thickness of the sheet.

In this welding edge preparation, edge strips (marginal cut) accumulate again and again and must be separated from the sheet panel during the trimming process.

As a rule, a so-called scrap-cutting machine is employed for this work. For this purpose, it has already been suggested to move a scrap-cutting torch associated with the torch-cutting machine by means of a geared engine and a lever bar and to separate thereby the marginal scrap strip resulting in this connection during the welding edge preparation (trimming).

The drawback in this known scrap-cutting torch is that the geared motor is arranged very close on the scrap-cutting torch (heat effects) and furthermore that due to the always repeating flying cut-in, the danger exists that the cut-in procedure would not be successful with each cycle.

SUMMARY OF THE INVENTION

The object of the present invention, therefore, is to provide a scrap-cutting arrangement which is completely functional without its own drive and, in addition, its structural assembly is kept simple and thus free of disturbances.

For the solution of this object, it is suggested according to the invention that the scrap-cutting arrangement be arranged directly on the torch unit and depending on the movement of the torch-cutting machine is actuated thereby.

According to a preferred embodiment of the invention, the scrap-cutting device is mounted on a carrier held by the torch carriage, the cutting torch(es) for the welding edge preparation being mounted on the end(s) of said carriage.

It is advantageous if the scrap-cutting device has a frame, wherein a scrap-cutting torch is movably arranged, to be placed on a workpiece. In this connection it is suitable if on the carrier there is mounted a lifting device on which the frame is mounted to be moved vertically.

According to a further ramification of this invention, a piston-cylinder unit is provided as the lifting device which has a bilateral guide. This bilateral guide makes certain that the frame does not swivel during lifting by the lifting device but instead remains aligned with its longitudinal axis being parallel to the direction of movement of the torch-cutting machine.

In an exemplary embodiment in the frame of the scrap-cutting device, a carriage, held by a guide rod and connected with the lifting device, is movably supported in the movement direction of the torch-cutting machine.

In order to make this carriage movement useful depending on the movement of the torch-cutting machine with a simultaneously stationary frame, it is furthermore proposed by the invention that a roller be arranged at the carriage, which is in operative contact with a starting incline arranged on a mounting of the scrap-cutting torch. By means of the connection of roller and starting incline, the starting incline is equally moved by the longitudinal movement of the carriage (in cutting direction), so that the scrap-cutting torch connected therewith may proceed in its cutting movement.

For the execution of this cutting movement, it is advantageous, furthermore, if the mounting is connected with a ball rod, which in turn is supported movably in a guide head attached at the frame.

Furthermore, with the novel exemplary embodiment, it is proposed that the guide rod for carriage and roller as well as the ball rod for the mounting of the scrap-cutting torch be arranged at right angles to each other.

This advantageous arrangement makes certain that the scrap cutting is always undertaken at right angles to the trimming cut (for the welding edge preparation), whereby the movement of the scrap-cutting torch may be kept at a minimum.

Finally, it is suitable according to the invention if in the area of the ends of the guide rod there is provided at the frame a switch each which is actuated by the carriage. By means of these two switches, the automatic guidance of the scrap-cutting device takes place, i.e. the valves for the processing gases and the lifting device are actuated.

THE DRAWINGS

DETAILED DESCRIPTION

Figure 1:
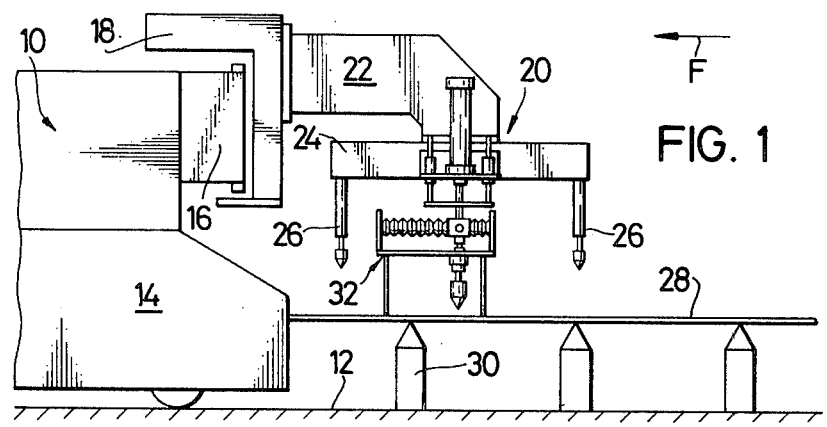
FIG. 1 shows a torch-cutting machine inclusive of the novel scrap-cutting device.

FIG. 1 shows a torch-cutting machine 10 in a simplified illustration. Machine 10 includes hoisting carriage 14, proceeding longitudinally on guide rails 12 with a transverse track 16 being arranged thereon, proceeding at right angles to the guide rails. This transverse track serves for holding and guiding at least one torch carriage 18, there being provided thereon a torch unit 20, which generally is vertically adjustable.

The torch unit 20 consists of a supporting arm 22 with a support 24 being mounted at the free end of said supporting arm. At the front ends of support 24 in the exemplary embodiment of FIG. 1 there is attached a cutting torch 26 each by means of which the rim area of a work piece 28, supported by a base support 30 is trimmed (welding edge preparation).

Figure 2:
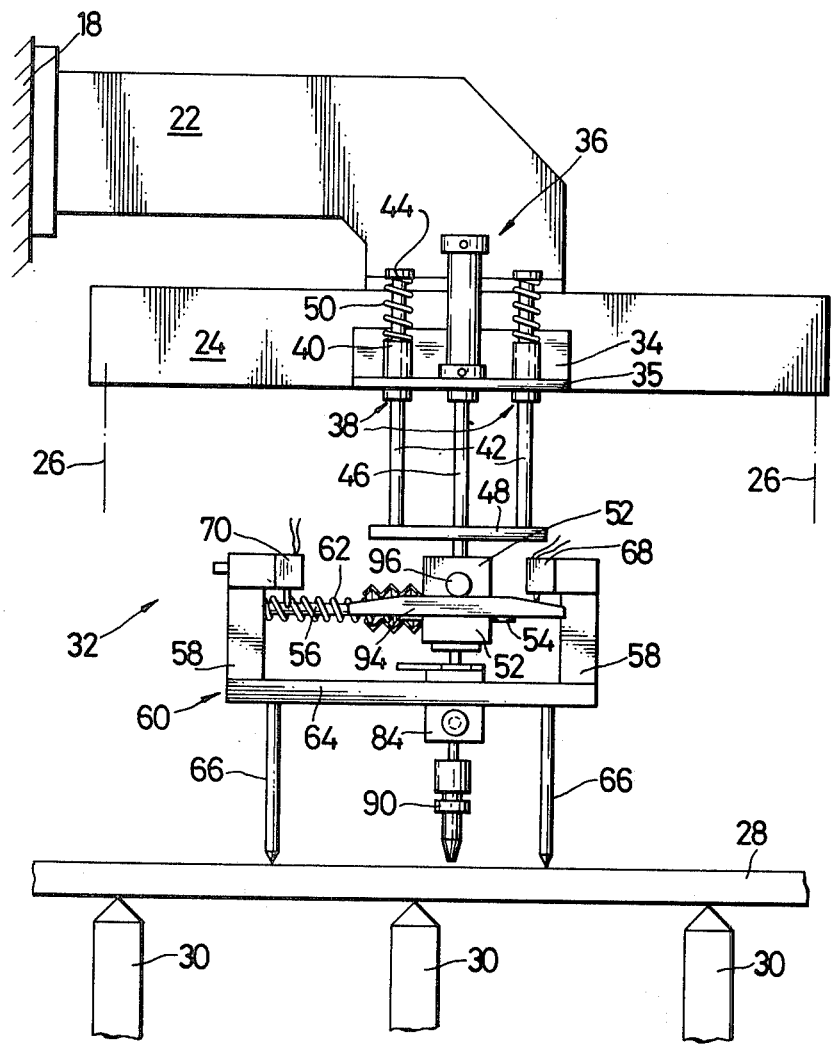
FIG. 2 shows the scrap-cutting device in enlarged form.

As further shown in FIG. 1, a scrap-cutting device 32 is mounted at support 24, and in particular in the central area thereof, the details of said scrap-cutting device being enlarged in FIGS. 2–5, and particularly in FIG. 2.

As shown in FIG. 2, a console 34 is bolted on at support 24 serving for the installation of a lifting device 36. The lifting device consists of a pneumatic piston-cylinder unit, which is mounted in the projecting, level part 35 of console 34. At both sides of the piston-cylinder unit are arranged guides 38 in part 35. Each of these guides consists of a sleeve 40 and of a guiding member 42 supported movably therein.

The upper free end of the guiding member in FIG. 2 has a collar 44 on which a pressure spring 50 abuts, which is supported at its other end by sleeve 40.

Both guide members 42 as well as piston rod 46 of lifting device 36, protruding downwards, carry a connecting plate 48. Piston rod 46 penetrates this connecting plate and on its free end supports a carriage 52. This carriage, an essential component part of the novel scrap-cutting device 32, is supported to be movable horizontally on a guide rod 56 by means of a collar 54. Guide rod 56 is bilaterally supported in side plates 58 of a frame 60. On guide rod 56 there is arranged, furthermore, a pressure spring 62, which is supported on the one (left) side plate 58 and collar 54 and urges frame 60 towards the left into the rest position (FIG. 2).

Both side plates 58 are supported by a base plate 64 with legs 66 arranged thereon projecting downwards, the legs with their conical ends supporting frame 60 and consequently the scrap-cutting arrangement 32 on work piece 28.

Furthermore, at both side plates 58 there is arranged a switch 67, 70, each, whose purpose will be described below.

Figure 4:
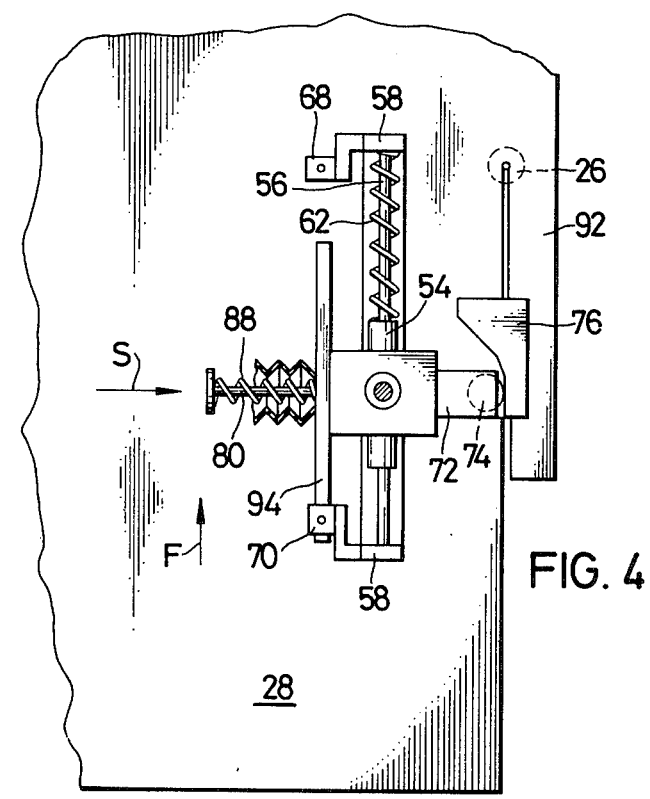
FIG. 4 is a partial top view of the scrap-cutting device.
Figure 3:
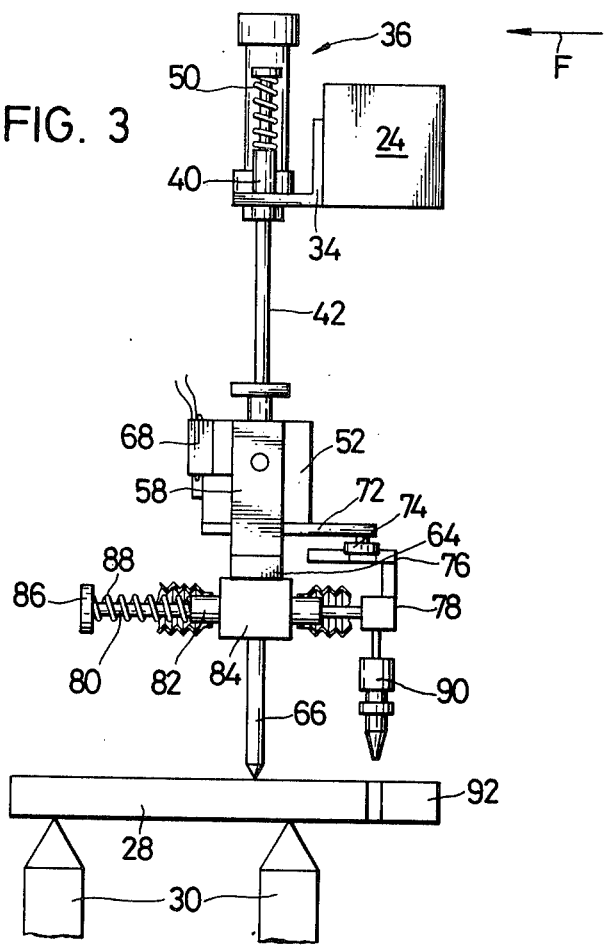
FIG. 3 is a side view of the scrap-cutting device from the right in accordance with FIG. 2.

As best seen in FIGS. 3 and 4, a mounting 72 is provided at carriage 52, at the free end of which a roller 74 is turnably supported. Roller 74 cooperates with a starting incline 76 (FIG. 5), which in turn is supported by a further mounting 78.

Mounting 78 forms one end of a ball rod 80, which is movably supported in a guide sleeve 82 of a guide head 84. At the left end of ball rod 80 in FIG. 3, there is provided a collar 86, supporting a pressure spring 88 by its one end while its other end abuts the guide sleeve 82.

Mounting 78, carried by ball rod 80, further serves for the installation of a scrap-cutting torch 90, which serves for cutting off the rim scrap 92 resulting in the trimming of the work piece edges with the cutting torches.

Guide head 84, wherein ball rod 80 is smoothly guided, is mounted in a stationary manner on frame 60, and particularly at its base plate 64. As particularly shown in FIG. 4, guide rods 56 and ball rod 80 are arranged at right angles to each other, so that the courses of movement of roller 74 and starting incline 76 proceed in two directions of movement as explained below.

FIG. 2 shows that at carriage 52 there is arranged a lug 94, by means of which alternately both switches 68, 70 provided at the side plates 58 are actuated during the movement of the carriage resulting in a guidance of the scrap-cutting device.

Now, if on a work piece 28, e.g. a plate of metal, its rim area is trimmed, in particular, by cutting torch 26 indicated by broken lines in FIG. 4, which moves in the movement direction F of the torch-cutting machine 10, a strip of rim scrap 92 is separated, but in which case the often very long rim scrap strip still remains connected to the remaining sheet.

In order to divide these rim scrap strips into the smallest possible pieces, the novel scrap-cutting device 32 is provided in the area of the cutting torch 26.

At the beginning of each scrap-cutting cycle, frame 60 supporting scrap-cutting torch 90 is set on its feet 66 on work piece 28 by the lifting arrangement by means of carriage 52 during the movement of the torch-cutting machine (the trimming procedure by means of cutting torch 26 is not interrupted).

By means of lifting device 36, mounted on support 24 and thus continuing to move in the direction F, the carriage 52 on guide rod 56 (ball rod construction) is moved towards the left in the direction F, i.e. from its starting position illustrated in FIG. 2, while frame 60 stands still, and particularly because of the compression force exerted by the lifting device 36.

Roller 74 pertaining to the carriage 52 and thus equally moved forward in the direction F in this connection comes in contact with starting incline 76 arranged at the ball rod. Due to the roller movement, the starting incline is pressed in the direction of arrow S, slowly at first (angle $\alpha$) and then with a somewhat higher speed (angle $\beta$). The same movement (S) is also executed by the scrap-cutting torch 90 connected with starting incline 76, i.e. said torch moves in this connection at right angles to the cutting direction of torch 26 and severs a piece of the rim scrap 92 formed.

Figure 5:
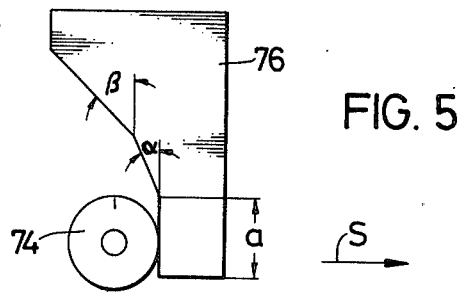
FIG. 5 shows the starting incline of FIG. 4 in an enlarged view.

As shown in FIG. 5, starting incline 76 has two different inclines, the first of which, angle alpha (30°) is provided for the initial burn through. Since with the same forward speed of the torch-cutting machine, the starting incline, due to the slight pitch (angle alpha), is moved insignificantly in the direction S, scrap-cutting torch 90 necessarily moves also by this same small measure within which the burn through of the rim scrap strip takes place. Upon reaching the greater incline, angle beta (45°) by roller 74, the burn through is completed and the scrap-cutting torch 90 is then moved at a greater forward speed in the direction S and severs the trim scrap 92.

As mentioned above, switches 68, 70 are provided for guiding the scrap-cutting device. Switch 68 (at the right in FIG. 2) serves for guiding the starting process of the cutting oxygen valve if switch 68 is released by lug 94 due to the carriage movement. This condition is always achieved, if roller 74 has cleared stretch $a$ of starting incline 76. (There is no scrap-cutting movement here; instead it stands still and heats the first cut position). At the beginning of the incline alpha, lug 94 has now simultaneously passed switch 68 and thereby the cutting oxygen value (not shown) is opened and thus the cutting process is initiated.

Now, if the carriage 52 nears its left (FIG. 2) end position on its course within frame 60, set by the movement of the torch-cutting machine, the separating cut of the scrap-cutting torch is also completed. In this left end position, switch 70 is actuated by lug 94, the lifting device being turned on by means of said switch and frame 60 being raised from the work piece with support by pressure springs 50 of guides 38. Simultaneously, the cutting oxygen valve for the scrap-cutting torch 90 is closed.

At the same moment when the connection between frame 60 and work piece 28 is severed, the frame is moved toward the left on the carriage by means of pressure spring 62 as a guide, so that lug 94 again actuates switch 68, mounted on the frame. However, switch 68 is electrically switched into readiness only then when the time relay mentioned below emits a signal for the renewed lowering of frame 60.

Since with this frame movement, the guide head 84 supporting the ball rod 80 is also moved relatively to carriage 52, roller 74 again reaches its starting position with reference to the starting incline 76, so that scrap-cutting torch 90 is retracted by pressure spring 88 equally into its starting position.

Simultaneous with the actuation of switch 70, a time relay (time clock) is also actuated, which after a set period of time "switches over" the lifting device 38, so that frame 60 is again placed on the work piece, this time at another position, and the scrap-cutting cycle begins anew—from the starting position in FIG. 2.

By means of FIG. 5, it was explained above that the starting incline has two slopes (angle alpha = 30° and beta = 45°). It is a matter of course and is within the scope of the invention to construct the starting incline 76 arbitrarily, so that a sufficiently long preheating time or cutting time, for example, is afforded thereby for the scrap-cutting torch or, furthermore, that the scrap-cutting speed may be maintained lower or also higher than the cutting speed of torch 26.

In the above-mentioned scrap-cutting device, there is arranged a single scrap-cutting torch. Needless to say, it is also possible to provide two or more scrap-cutting torches at the device should this be suitable.

In principle, it would suffice to arrange at frame 60 one leg 66 as support for the scrap-cutting device on the work piece. However, it has been shown to be suitable to provide two legs on frame 60 in order to maintain statically in equilibrium the compressive force exerted by the piston rod 46 on the frame (by means of carriage 52).

Since it occurs again and again that the work piece to be processed is not even or is not level on the base plate 30, FIG. 2 shows that in carriage 52 there is provided a pin 96 which is connected with the piston rod 46. As a result, frame 60 may swivel on pin 96. This pendulum possibility makes certain that frame 60 may always be adapted with its feed to uneven or not horizontally lying work pieces. This possibility would not be provided with a rigid connection between piston rod 46 and carriage 52, so upon the setting up of only one foot 66—due to the unevenness of the work piece —moments may occur with respect to frame 60 which under certain conditions would lead to a damage to said frame.

The scrap-cutting device explained by means of an exemplary embodiment has many advantageous over prior art:

a. A separate drive for the movement of the scrap-cutting torch is not required.

b. With a once determined contour of the starting incline 76, the torch-cutting speed of the scrap-cutting torch 90 is adapted to the torch-cutting speed of cutting torch 26, and indeed automatically by necessity.

c. The problematic adapting of the torch-cutting speeds of scrap-cutting torches of a plurality of scrap-cutting devices to a torch-cutting machine is eliminated.

d. The above-described exemplary embodiment allows the scrap-cutting torch a certain period of stay for heating up the cut-in point; a flying cut is no longer necessary, therefore.

e. A simple circuit arrangement makes certain that the cutting oxygen is supplied to the scrap-cutting torch only at the moment it is required. The cutting oxygen supply is therefore timely coupled with the cutting speed of the torch-cutting machine.

f. Upon a completed scrap cutting and lifting of the device from the work piece, the cutting oxygen is again turned off by this lifting procedure and consequently an unnecessary loss of cutting oxygen is avoided.

What is claimed is:

1. In a flame cutting machine for welding seam preparation comprising a traveling carriage provided with a transverse track, at least one torch carriage with at least one torch unit arranged movably on the transverse track with at least one cutting torch, and a scrap cutting arrangement with at least one scrap cutting torch, the improvement comprising said scrap cutting arrangement being mounted directly on said torch unit and movable therewith, said scrap cutting arrangement being further provided with means to move said scrap cutting torch relative to said torch unit, whereby the speed at which said scrap cutting torch is moved is directly proportional to the speed at which said cutting torch moves.

2. In the flame cutting machine of claim 1, characterized in that said scrap cutting arrangement is arranged on a carrier held by said torch carriage at the end of which said cutting torch is mounted for said welding seam preparation.

3. In a flame cutting machine for welding seam preparation, comprising a traveling carriage provided with a transverse track and of at least one torch carriage with at least one torch unit arranged movably on the transverse track with at least one cutting torch as well as with a scrap cutting arrangement, the improvement comprising said scrap cutting arrangement being mounted directly on said torch unit, said scrap cutting arrangement being activated in accordance with the movement of said flame cutting machine, said scrap cutting arrangement being arranged on a carrier held by said torch carriage at the end of which said cutting torch is mounted for said welding seam preparation, said scrap cutting arrangement having a frame attachable on a workpiece and a scrap-cutting torch being arranged movably in said frame.

4. In the flame cutting machine of claim 3, characterized in that on said carrier there is mounted a lifting arrangement on which said frame is attached to be movable vertically.

5. In the flame cutting machine of claim 4, characterized in that a piston-cylinder unit is provided as said lifting arrangement, and said piston-cylinder unit being provided with a bilateral guide.

6. In the flame cutting machine of claim 5, characterized in that in said frame of said scrap-cutting arrangement a sliding carriage connected with said lifting arrangement is supported movable in the direction of movement of said flame-cutting machine on a guide rod attached to said frame.

7. In the flame-cutting machine of claim 6, characterized in that a roller is arranged on said sliding carriage, said roller being in operative connection with a starting incline arranged on a mounting of said scrap-cutting torch.

8. In the flame-cutting machine of claim 7, characterized in that said mounting is connected with a ball rod, said ball rod being supported movably in a guide member mounted on said frame.

9. In the flame-cutting machine of claim 8, characterized in that said guide rod for said sliding carriage and said ball rod are arranged at right angles to each other.

10. In the flame-cutting machine of claim 9, characterized in that said guide rod receives a pressure spring whose one end abuts said sliding carriage and whose other end abuts said frame.

11. In the flame-cutting machine of claim 10, characterized in that on said ball rod there is arranged a pressure spring having its one end abutting a guide bearing of said guide member and its other end abutting a collar of said ball rod.

12. In the flame-cutting machine of claim 11, characterized in that in the area of the ends of said guide rod at said frame there is provided switch means actuable by said sliding carriage.

13. In the flame-cutting machine of claim 12, characterized in that said switch means comprises a pair of switches, one of said switches being connected with a cutting oxygen valve and the other of said switches being connected with said cutting oxygen valve, with said lifting arrangement, and with a time relay.

14. In the flame-cutting machine of claim 13, characterized in that a lug is provided for actuating said switches.

15. In the flame-cutting machine of claim 14, characterized in that with frame attached to a workpiece, said sliding carriage may be movable on said guide rod in the cutting direction in such a manner that said roller of said sliding carriage actuates a starting incline with which the scrap-cutting torch is connected in such a manner that said scrap-cutting torch may be moved at right angles to the direction of movement of said sliding carriage.

* * * * *